Patented July 4, 1950

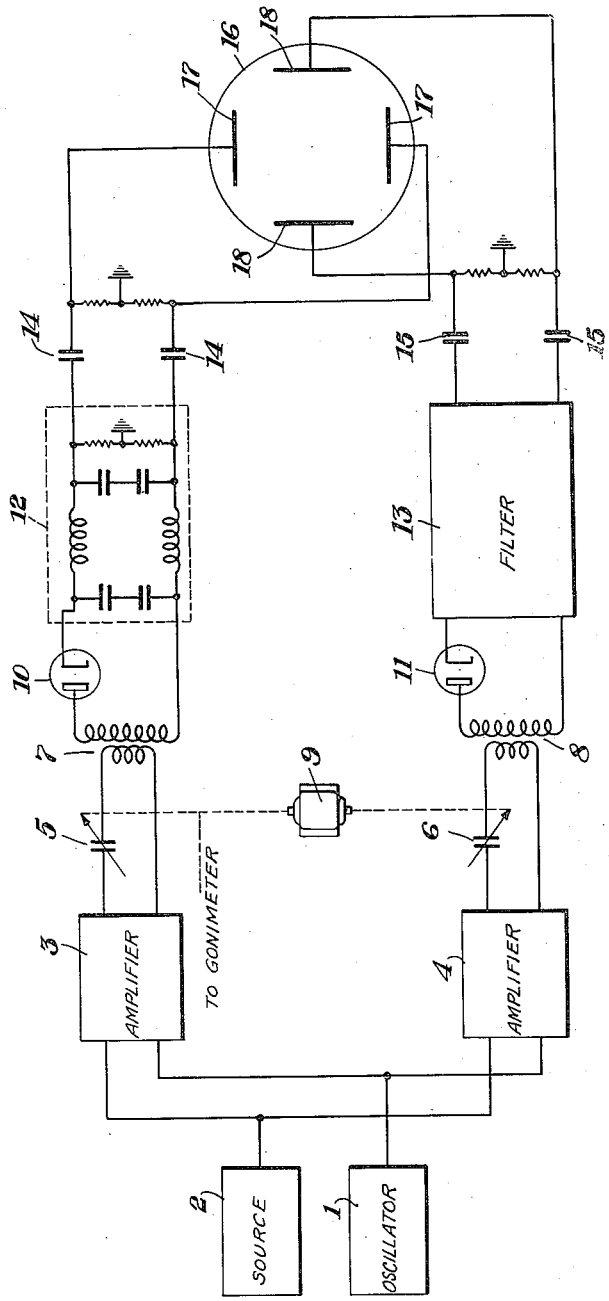

2,513,293

UNITED STATES PATENT OFFICE 2,513,293

SWEEP CIRCUIT SYSTEM

Louis A. de Rosa, West Brighton, and Frank J. Lundberg, New York, N. Y., assignors to Federal Telephone and Radio Corporation, New York, N. Y., a corporation of Delaware Application April 9, 1945, Serial No. 587,238

8 Claims. (Cl. 315—24)

1

The present invention relates to sweep circuit systems for rotating the beam of cathode ray tubes and particularly to those systems where signals are used to radially deflect the circular trace thus produced.

In certain direction finding systems, as well as in other systems, the beam of a cathode ray tube or oscilloscope is moved in a circle over the screen at a relatively slow rate such as for example, 5 cycles per second. For obtaining satisfactory indications at this slow sweep, an oscilloscope having a high persistence screen must be employed. Such oscilloscopes require high deflecting voltages, for example of about 900 volts R. M. S., or about 1260 volts from peak to peak.

To obtain a circular sweep, two sine waves of the same frequency but 90° out of phase are applied to the vertical and horizontal deflecting plates of the oscilloscope. While satisfactory circular sweep circuits of low voltage have been disclosed in the prior art such as for example, in A. G. Richardson-T. H. Clark, Serial No. 513,198, filed December 6, 1943, and issued December 28, 1948 as Patent No. 2,457,178 for "Resistance Sine Wave Generator," it has been difficult to obtain a satisfactory circular sweep circuit producing high voltages. Attempts to amplify the output of low voltage, low frequency sweep circuits have been unsatisfactory since the amplifier must be a D. C. amplifier and it is difficult to obtain or make a suitable D. C. amplifier for such use. Besides such D. C. amplifiers tend to be cumbersome and expensive.

An object of the present invention is the provision of an improved sweep circuit for cathode ray tubes and particularly one which provides high sweep voltages of relatively low frequencies.

Other and further objects of the present invention will become apparent and our invention will be best understood from the following description of an embodiment thereof, reference being had to the drawing, in which the single figure is a schematic diagram of a sweep circuit arrangement embodying our invention.

Referring now to the figure, the sweep circuit includes an oscillator 1 designed to operate at a relatively high frequency, such as, for example, 30 megacycles, which frequency is higher than the frequency output of a signal source 2 such as a direction finding receiver, which latter frequency may be for example 200 kilocycles and lower. The output of the oscillator 1 is fed to two amplifiers 3 and 4 respectively. These amplifiers are modulated, preferably grid modulated by the output of source or receiver 2. This modula-

2 tion is preferably solely a downward modulation, that is, the modulation does not increase the output of the amplifiers beyond that produced by the oscillator but instead decreases said output in proportion to the amount of the modulating voltages derived from source 2.

The output of amplifiers 3 and 4 is fed through variable coupling condensers 5 and 6 respectively to step-up transformers 7 and 8 respectively. Condensers 5 and 6 are used to vary the coupling between the amplifiers and the primary of their respective transformers 7 and 8, so as to vary the energy impressed upon the primary of each of said transformers. Condensers 5 and 6 are ganged together and adapted to be rotated at a constant very low frequency such as for example, 5 cycles per second by means of a motor 9 or other suitable means which in turn is synchronized with the goniometer of the direction finding system for the switching of the directional antennas, as is disclosed in H. G. Busignies, Serial No. 553,598, filed September 11, 1944, for "Direction Finders." Condensers 5 and 6 are so shaped that as they rotate they vary the coupling sinusoidally. Moreover, said condensers are ganged together so as to vary their outputs 90° out of phase with each other at said very low frequency (5 cycles per second). The secondaries of transformers 7 and 8 are connected to rectifiers 10 and 11 which rectify the A. C. energy supplied thereto, which energy is then passed through filters 12 and 13 respectively which block out the highest frequency component (30 megacycles) produced by oscillator 1, and pass the 5 cycle per second component as well as the components introduced by the modulation from receiver 2. The outputs of filters 12 and 13 which are sinusoidal are then passed through sets of blocking condensers 14 and 15, respectively to the deflecting plates of an oscilloscope 16, the output of filter 12 being connected to the vertically deflecting plates 17 and the output of filter 13 being connected to the horizontally deflecting plates 18.

While we have described above the principles of our invention in connection with specific apparatus, it is to be clearly understood that this description is made only by way of example and not as a limitation on the scope of our invention as defined in the accompanying claims.

We claim:

1. In a high frequency signalling system employing a cathode ray tube, means for generating a high voltage sweep circuit for said tube comprising an oscillator producing waves of a frequency of the order of several megacycles, a further source of signalling frequency of the order of a few hundred kilocycles and lower, means including an amplifier for modulating the first mentioned waves by said signalling frequency, capacitive means for cyclically varying the output of the amplifier at a relatively low frequency, means for increasing the voltage of said low frequency component, and means for rectifying and filtering said increased voltage.

2. System according to claim 1, in which the means for increasing the voltage comprises a step-up transformer.

3. System according to claim 1, wherein the output of the modulating means comprises two channels and said capacitive means is included in the respective channels and adjusts the respective voltages therein to be in phase quadrature, and means for applying the outputs of said channels to the deflecting circuits of said cathode ray tube.

4. In combination, a source of signal energy having a relatively medium frequency, an oscillator adapted to operate at a frequency of the order of several megacycles, an amplifier connected to the output of said oscillator and modulated by the energy from said source, a rectifier, variable coupling means arranged between the output of said amplifier and said rectifier, said coupling means being adapted to sinusoidally vary the output of said amplifier at a relatively low frequency, a filter connected to the output of said rectifier and adapted to block the relatively high frequency components while passing the medium and low frequency components, and an oscilloscope having a pair of deflection plates coupled to the output of said filter.

5. In a circuit for producing a circular sweep for a cathode ray tube; an oscillator producing a wave of the order of several megacycles modulated by a signal wave of lower frequency, a pair of amplifiers each coupled to the output of said oscillator and adapted to amplify its output, capacitive coupling means for cyclically varying the output of each of said amplifiers at a common low frequency and 90° out of phase, and means for removing the high frequency components of the cyclically varied output of each amplifier while passing said low frequency variations, said low frequency variations being applied to separate pairs of the deflecting plates of said tube.

6. In a circuit according to claim 5, including a pair of rectifiers, said capacitive means variably coupling said amplifiers to separate ones of said rectifiers at a sinusoidally varying low frequency and 90° out of phase at said low frequency, and a pair of filters separately connected to the output of said rectifiers and adapted to block the high frequency components and pass the low frequency variations, each of said filters being coupled to a separate pair of deflecting plates of said tube.

7. In combination, a source of signal energy having a frequency of the order of two hundred kilocycles or lower, an oscillator adapted to operate at a frequency of the order of several megacycles, a pair of amplifiers connected to the output of said oscillator and modulated by the energy from said source, means for sinusoidally varying the output of each of said amplifiers at a common relatively low frequency but 90° out of phase, means for removing the high frequency components of the sinusoidally varied output of each amplifier while passing the medium and low frequency variations, and an oscilloscope having two pairs of deflection plates to which the energy passed through said last-mentioned means is applied.

8. An indicator circuit comprising a source of high frequency waves of the order of several megacycles, a source of modulation signals, an amplifier circuit, means for modulating said high frequency waves comprising said modulation signals and said amplifier circuit, electrostatic coupling means, means for variably controlling the degree of coupling of said last named means at a given frequency rate, means for modulating at said given frequency the modulation output of said amplifier circuit comprising said electrostatic coupling means, means including a step-up transformer for amplifying said given frequency modulated signals, means for demodulating said given frequency modulated for obtaining a given frequency modulation envelope of said high frequency waves, means for applying said last named signals to said indicator.

LOUIS A. DE ROSA.
FRANK J. LUNDBERG.

REFERENCES CITED

The following references are of record in the file of this patent:

UNITED STATES PATENTS

| Number | Name | Date |
| --- | --- | --- |
| 2,135,171 | Chireix | Nov. 1, 1938 |
| 2,215,197 | Sherman | Sept. 17, 1940 |
| 2,241,809 | De Forest | May 13, 1941 |
| 2,275,974 | Mathes | Mar. 10, 1942 |
| 2,374,666 | Cunniff | May 1, 1945 |
| 2,421,747 | Engelhardt | June 10, 1947 |